United States Patent [19]

Thornton

[11] 4,040,460
[45] Aug. 9, 1977

[54] COLLAPSIBLE BUCKET

[76] Inventor: Sidney Thornton, 323 South 11th Ave., Mount Vernon, N.Y. 10550

[21] Appl. No.: 643,786

[22] Filed: Dec. 23, 1975

[51] Int. Cl.² ............................................. A45C 7/00
[52] U.S. Cl. .................................................. 150/48
[58] Field of Search ...................... 150/48, 49, 50, 51; 220/8

[56] References Cited

U.S. PATENT DOCUMENTS

| | | | |
|---|---|---|---|
| 1,670,709 | 5/1928 | Blood | 150/48 |
| 1,848,929 | 3/1932 | Berg | 150/49 |
| 2,476,531 | 7/1949 | Berg | 150/49 |
| 2,619,249 | 11/1952 | Whittington | 220/8 |
| 2,664,131 | 12/1953 | Miller | 150/49 |
| 2,887,243 | 5/1959 | Murdock | 220/8 |

Primary Examiner—Donald F. Norton
Attorney, Agent, or Firm—Eugene V. Mandel

[57] ABSTRACT

A collapsible bucket including telescoping erecting members for the opening and closing thereof.

5 Claims, 4 Drawing Figures

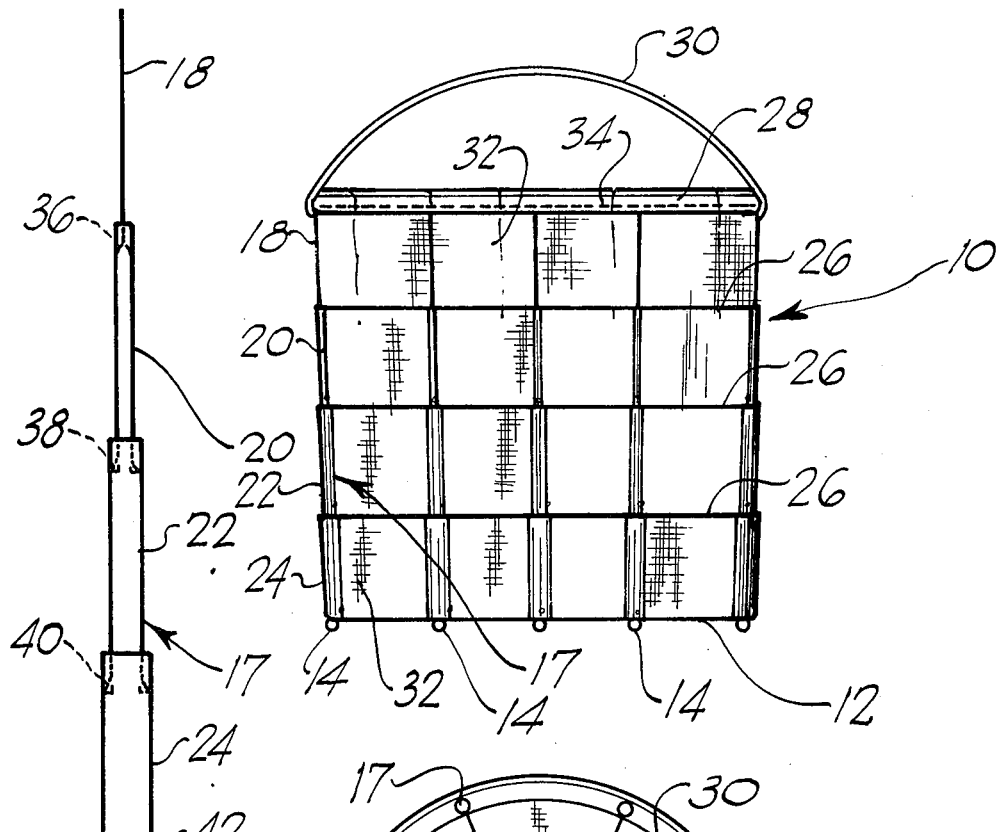
FIG. 1
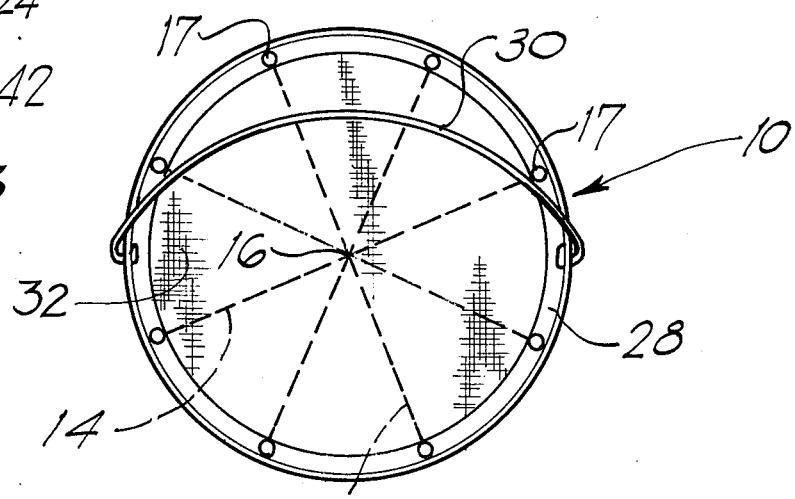
FIG. 2
FIG. 3
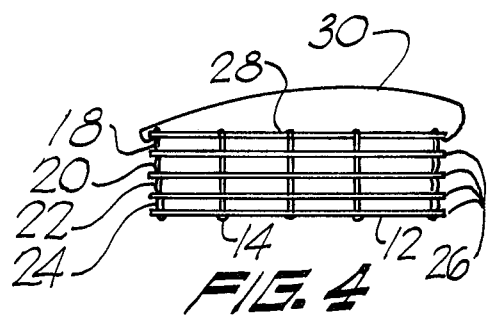
FIG. 4

COLLAPSIBLE BUCKET

BACKGROUND OF THE INVENTION

This invention relates to buckets, and more particularly to a collapsible bucket.

Collapsible buckets are well known in the prior art, and certain types are in use today. A collapsible bucket is preferably light weight and may be reduced to a form that occupies a relatively small space. These features are usually desired by campers. The prior art discloses collapsible buckets for example, in the U.S. Pat. No. 1,670,709, issued to Blood on May 22, 1928. The disclosure therein describes a type of collapsible bucket that is braced in the open position by a plurality of brace members that are manually inserted into a bottom plate. This is a time consuming operation that requires attention and much manual dexterity. When the bucket disclosed in Blood is collapsed the support members are free within the fabric member and may puncture the same unless great care is taken. While the pail is in use the contents tend to spread the fabric member away from the frame causing a lack of durability. The embodiment described in Berg, U.S. Pat. No. 1,848,929, issued Mar. 8, 1932 shows a bucket which, when collapsed, forms a shape that is irregular and difficult to store in limited space. A singular hoop is used to encircle the body of the bucket and offers little support as it is employed as a locking means. No support is provided in the base which may contribute to the strain or splitting of the fabric pail. A similar problem of lack of support in a base of a collapsible pail exists in U.S. Pat. No. 2,664,131 issued to Miller on Dec. 29, 1953. This embodiment offers little support to the side walls of the pouch aside from reinforced stitching.

Accordingly, it is a primary object of the present invention to provide a collapsible bucket which may easily and quickly be opened and closed.

It is a further object of the present invention to provide a collapsible bucket with base support members that will not cause damage to the fabric member.

A still further object of the present invention is to provide a collapsible bucket with a plurality of telescoping erecting members.

Another object of the present invention is to provide a collapsible bucket with a plurality of support rings.

Still another object of the present invention is to provide a collapsible bucket that forms a relatively compact structure when closed.

These objects, as well as further objects and advantages, of the present invention will become readily apparent after reading the description of a non-limiting illustrative embodiment and the accompanying drawing.

SUMMARY OF THE INVENTION

A collapsible bucket, according to the principles of the present invention comprises a bottom rim, a plurality of base support members affixed to said bottom rim, a plurality of telescoping erecting members affixed to said bottom rim, a plurality of support rings affixed to the telescoping erecting members, a top rim affixed to the top of said telescoping erecting members, a handle affixed to said top rim, and a collapsible fabric member disposed over said top rim and secured.

BRIEF DESCRIPTION OF THE DRAWINGS

In order that the present invention may be more fully understood it will now be described, by way of example, with reference to the accompanying drawings in which:

FIG. 1 illustrates a pictorial representation of a collapsible bucket incorporating the principles of the present invention;

FIG. 2 illustrates a top view of the preferred embodiment;

FIG. 3 shows a side view of a telescoping erecting member; and

FIG. 4 illustrates the preferred embodiment of the present invention in the closed position.

DESCRIPTION OF THE PREFERRED EMBODIMENT

Referring now to the Figures, and more particularly, to the embodiment illustrated in FIGS. 1 and 2 showing a collapsible bucket 10 in the open position. The bottom of a base rim 12 is affixed to a plurality of base support members 14 that intersect and are mutually secured at a point 16. The top of the base rim 12 is affixed to a plurality of telescoping erecting members 17 directly above the contact points of the base rim 12 and the base support members 14.

Telescoping erecting members 17 includes a first section 18 which telescopes inside a second section 20 capable of telescoping within a third section 22 which telescopes inside a fourth section 24. A plurality of support rings 26 are affixed to the telescoping erecting members 17 at the tops of sections 20, 22 and 24. The tops of the sections 18 are affixed to a top rim 28. A handle 30 for carrying the bucket 10 is mounted on the top rim 28 in a customary fashion.

A collapsible fabric member 32 is draped over the top rim 28 and secured with stitches 34. Collapsible waterproof fabric member 32 is of sufficient size to fill the structure formed by erecting members 17, support rings 26 and base support members 14.

FIG. 3 illustrates a side view of a telescoping erecting member 17. The bottom ends of the sections 18, 20, 22 are fitted with compression cups 36, 38 and 40 respectively. Elements 24 have a small hole 42 bored in their sides near their bases.

FIG. 4 shows the collapsible bucket 10 in the closed position with elements 18, 20, 22 and 24 respectively telescoped inside each other.

In operation, to open the bucket 10, the user pulls on handle 30 while holding the base support members 14 at the point 16. To close the bucket, the user pushes on the top rim 28 while holding the bucket at the point 16. When the bucket is closed the air inside telescoping erecting members 18 is compressed and is forced out of the holes 42 in the sides of fourth sections 24. The compression of this air causes a dampening effect which contributes to smoothness of operation. Since hole 42 is relatively small the bucket will not collapse even when empty unless deliberate pressure is applied to top rim 28.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A collapsible bucket, comprising:
   a. a bottom rim;
   b. a plurality of base support members affixed to said bottom rim;
   c. a plurality of telescoping erecting members affixed to said bottom rim;
   d. a plurality of support rings affixed to said telescoping erecting members;
   e. a top rim affixed to the top of said telescoping erecting members;
   f. a handle affixed to said top rim; and
   g. a collapsible fabric member disposed over said top rim and secured thereto.

2. A collapsible bucket according to claim 1, wherein said plurality of base support members are affixed to said bottom rim directly below the point at which said telescoping erecting members are affixed thereon.

3. A collapsible bucket according to claim 1, wherein changes in said telescoping erecting members are air dampened.

4. A collapsible bucket according to claim 1, wherein said telescoping erecting members and said base support members are exterior to said fabric member.

5. A collapsible bucket according to claim 1, wherein the fabric is substantially waterproof.

* * * * *